(12) United States Patent
Tokarz

(10) Patent No.: US 7,977,518 B2
(45) Date of Patent: *Jul. 12, 2011

(54) TRANSVERSE-FLOW PYROCATALYTIC REACTOR FOR CONVERSION OF WASTE PLASTIC MATERIAL AND SCRAP RUBBER

(76) Inventor: Zbigniew Tokarz, Belchatow (PL)

(*) Notice: Subject to any disclaimer, the term of this patent is extended or adjusted under 35 U.S.C. 154(b) by 317 days.

This patent is subject to a terminal disclaimer.

(21) Appl. No.: 12/287,773

(22) Filed: Oct. 14, 2008

(65) Prior Publication Data

US 2009/0078557 A1    Mar. 26, 2009

Related U.S. Application Data

(60) Division of application No. 11/725,037, filed on Mar. 16, 2007, now Pat. No. 7,563,345, which is a continuation of application No. 10/968,369, filed on Oct. 19, 2004, now Pat. No. 7,285,186.

(30) Foreign Application Priority Data

Dec. 11, 2003  (PL) .......................... 364006
Feb. 18, 2004  (PL) .......................... 365361

(51) Int. Cl.
   *C07C 4/00*   (2006.01)
   *C10B 43/00*  (2006.01)
(52) U.S. Cl. ............. 585/241; 201/2.5; 201/25; 202/96; 202/212; 202/262
(58) Field of Classification Search .................. 585/241; 201/2.5, 25; 202/96, 212, 262
See application file for complete search history.

(56) References Cited

U.S. PATENT DOCUMENTS

| | | |
|---|---|---|
| 1,601,777 A | 10/1926 | Spotz |
| 2,459,550 A | 1/1949 | Stamm |
| 3,668,120 A | 6/1972 | Patterson |
| 3,977,960 A | 8/1976 | Stout |
| 4,374,499 A | 2/1983 | Fassell |
| 4,851,601 A | 7/1989 | Fukuda et al. |
| 4,925,532 A | 5/1990 | Meuser et al. |
| 5,085,738 A | 2/1992 | Harris et al. |
| 5,396,850 A | 3/1995 | Conochie et al. |
| 5,776,420 A | 7/1998 | Nagel |
| 6,037,517 A | 3/2000 | Wagner |
| 6,051,110 A | 4/2000 | Dell'Orfano et al. |
| 7,563,345 B2 * | 7/2009 | Tokarz ............................ 202/96 |

FOREIGN PATENT DOCUMENTS

| | | |
|---|---|---|
| EP | 0 395 486 A2 | 10/1990 |
| PL | 352341 A | 8/2003 |
| PL | 352342 A | 8/2003 |
| WO | WO 95/06682 A1 | 3/1995 |
| WO | WO 03/070815 A1 | 8/2003 |
| WO | WO 2004/030885 A2 | 4/2004 |

(Continued)

*Primary Examiner* — N. Bhat
(74) *Attorney, Agent, or Firm* — Hudak, Shunk & Farine Co. LPA

(57) ABSTRACT

A process and system for converting organic waste into reusable hydrocarbon is described wherein the process includes feeding an organic waste into a pyrocatalytic reactor which is essentially free of halogenated synthetic resinous material into a molten lead bath which is confined in a reactor in an substantially oxygen-free atmosphere which is admixed with a catalytic material comprising particulate aluminum oxide and aluminum powder. The waste is thermally and catalytically converted with at least 50% effectiveness to produce a reusable hydrocarbon.

27 Claims, 5 Drawing Sheets

FOREIGN PATENT DOCUMENTS

| | | |
|---|---|---|
| WO | WO 2004/031674 A1 | 4/2004 |
| WO | WO 2004/072163 A1 | 8/2004 |
| WO | WO 2004/072208 A1 | 8/2004 |
| WO | WO 2005/056178 A1 | 6/2005 |
| WO | WO 2005/078049 A1 | 8/2005 |
| WO | WO 2006/044157 A1 | 4/2006 |

* cited by examiner

TRANSVERSE-FLOW PYROCATALYTIC REACTOR FOR CONVERSION OF WASTE PLASTIC MATERIAL AND SCRAP RUBBER

CROSS REFERENCE

This is a division of application Ser. No. 11/725,037, filed Mar. 16, 2007, now U.S. Pat. No. 7,563,345, which in turn is a continuation of prior application Ser. No. 10/968,369, filed on Oct. 19, 2004, now U.S. Pat. No. 7,285,186 issued Oct. 23, 2007, of Zbigniew Tokarz, for TRANSVERSE-FLOW PYROCATALYTIC REACTOR FOR CONVERSION OF WASTE PLASTIC MATERIAL AND SCRAP RUBBER, which claims priority to Polish Application Nos. P 364006 filed Dec. 11, 2003 and P 365361 filed Feb. 18, 2004.

FIELD OF THE INVENTION

The present invention relates to an improvement in a pyrolysis reactor wherein organic waste is catalytically converted into hydrocarbons which are recovered as vapor issuing from a molten lead bath. "Organic waste" or "waste" for brevity, refers herein to a predominantly hydrocarbon synthetic resinous materials, substantially free of halogen-containing resins, referred to herein as "plastics", and, rubber from scrap tires.

The plastics or rubber are mixed with a unique catalyst as the mixture is moved along the heated molten lead along the length of the bath, longitudinally from the bath's feed-inlet end to its residue-discharge end, while the bath is heated with a heating medium flowing first in a longitudinal direction, then in a direction transverse to the flow of waste. The reactor is therefore referred to as a "transverse-flow pyrocatalytic" reactor. The transverse direction is referred to herein as the "x"-axis, the longitudinal axis is referred to as the "y"-axis and the vertical direction is referred to as the "z"-axis. Vapors of hydrocarbons generated within the reactor, which vapors are readily condensable in a cold water heat exchanger, are recovered in a conventional recovery system. The recovered, condensed hydrocarbons are preferably further conventionally refined for use as diesel fuel, gasoline and heating oil; and the non-condensable hydrocarbons, along with carbon monoxide and carbon dioxide are preferably recycled as a gaseous recycle stream to provide fuel for burners used to generate hot gases to heat the bath.

BACKGROUND OF THE INVENTION

The Problem: Molten lead, used as a heating medium to pyrolyze plastics and rubber waste in the prior art, presents unique problems because lead is about 11.5 times heavier than the waste—the waste is quickly forced to the surface preventing contact time with the lead long enough to convert the waste in a reasonable amount of time. Particularly when solid waste includes polyolefins, poly(vinyl aromatic)s, and rubber from worn out tires, it is difficult to provide an economical level of conversion to reusable hydrocarbons within a residence time (in the molten bath) of less than 1 hour, preferably less than 30 min. "Reusable hydrocarbons" refers to both higher molecular weight hydrocarbons which are condensed, and lower molecular weight hydrocarbons which can be recycled as fuel. Reusable hydrocarbons consist of a major proportion by weight of condensable $C_5^+$ hydrocarbons (having at least five carbon atoms) and a minor proportion (relative to the $C_5^+$ hydrocarbons) of non-condensable $C_1$-$C_4$ hydrocarbons, typically less than 20% by weight of the $C_5^+$ hydrocarbons, the components in the vapor phase being in equilibrium with those in the condensate at the temperature and pressure conditions of condensation within the condenser.

Though a molten lead bath is able to provide a source of heat at a chosen, substantially constant temperature, using molten lead (or "melt") as a heat transfer medium in a substantially oxygen-free atmosphere in the reactor, presents numerous difficulties. To begin with, a floating layer of organic waste acts as an insulating barrier, preventing pieces of waste within the floating layer from being heated sufficiently to depolymerize. If the waste cannot be adequately contacted with the melt it does not matter how much melt is in the bath. Yet, efficient heat transfer from the melt to the waste, to obtain an economic residence time in the melt, must not interfere with being able to transport the waste longitudinally through the melt. To cope with this problem by providing a high enough bath temperature to effect the pyrolysis in a reasonable amount of time, results in too high a production of hydrocarbons lower than $C_4$, appreciable CO and $CO_2$. To complicate the problem, when using a solid, particulate, catalyst it is critical that the waste be contacted and mixed with both the catalyst and the melt.

When such a catalyst is a combination of an aluminum powder and aluminum oxide mineral, whether calcined hydrated alumina, or calcined zeolite, this mixing is difficult to do without using a fluid bed. "Zeolite" refers to a natural or synthetic composition typically having the structure $M_{x/n}[(AlO_2)_x(SiO_2)_y \cdot zH_2]$ where n is the charge of the metal cation, $M^{n+}$, which is usually $Na^+$, $K^+$, or $Ca^{2+}$, x and y are integers, typically having substantially the same value in the range from 2 to 10, and the z is the number of moles of water of hydration.

Since conversion of scrap rubber generates sulfur and sulfur-containing compounds, the catalyst, most preferably a combination of aluminum powder and calcined bauxite powder, is required to be substantially unreactive with both, the sulfur and sulfur-containing compounds, and chlorine and hydrochloric (HCl) acid gases, if such gases are present in an appreciable amount. In addition, the reactor requires an essentially oxygen-free atmosphere within it; and the high specific gravity of lead precludes using very much of the melt in the bath, for practical cost considerations relating to the structural requirements of a vat or trough in which the molten lead bath is held.

Moreover, though the housing and other components of the reactor are typically made of acid and heat-resistant sheet steel, e.g. H25N20S2, the steel does not have notably long-term resistance to $SO_2$, $H_2SO_3$, chlorine and HCl gases. The reliance on affordable steel and the use of aluminum powder in the catalyst requires feeding plastic substantially free of a halogen-containing synthetic resin, to the reaction zone, if safe, long-term operation of the reactor is sought. By "substantially free of a halogen-containing synthetic resin" is meant that less than 5% by weight of the waste is a polymer containing chlorine, bromine, iodine or fluorine, e.g. poly (vinyl chloride) ("PVC") scrap, or other halogen-containing synthetic resins, e.g. chlorofluoro-, chlorobromo- and fluorocarbon polymers.

The Prior Art:

Molten metal, particularly lead, has been the heat transfer medium of choice for the thermal conversion of organic matter, generally. The problem of heating organic matter which floated on a molten lead bath was recognized as early as before 1926 when U.S. Pat. No. 1,601,777 disclosed moving crushed shale along the undersurface of a slightly inclined apertured member, beneath the surface of a heated bath. U.S. Pat. No. 2,459,550 addresses the problem by confining wood or coal pieces between two endless screens. U.S. Pat. No. 3,977,960 teaches using angularly inclined screw conveyors to force crushed shale into a molten bath. As recently as 1990, U.S. Pat. No. 4,925,532 teaches moving perforated baskets filled with waste on an endless conveyor; the baskets are hooked to the conveyor to prevent them from floating against guide rails above the baskets. The '532 patent teaches that it is critical that the molten lead bath be maintained above 343° C. (650° F.), ignoring the fact that the melting point of pure lead at atmospheric pressure is just below, i.e. 327.5° C. (621.5° F.). It failed to realize that a catalyst could enhance conversion; and it missed the fact that optimum conversion of polyolefins, polystyrene and scrap from tires, to vapor consisting essentially of a major proportion by weight of $C_5^+$ hydrocarbons occurs only in the narrow range from 450° C.-550° C. (842° F.-1022° F.), a range commencing more than 100° C. above the temperature deemed critical. Most recently, in 1992, U.S. Pat. No. 5,085,738 teaches using a long, upwardly inclined oxygen-free cylindrical chamber filled with molten lead, through which chamber pieces of scrap tires are forced. A ram is used to circumvent the problem of floating rubber, but still relying solely on the thermal pyrolysis of the submerged rubber. The prior art countered the high specific gravity of molten lead by confining the charge in the melt. It ignores the problem of essentially instantly solidifying molten lead on the rubber as it is fed, because of the low heat capacity (and specific heat) of the lead; and, the requirement of timely supplying adequate heat to re-melt the lead.

It will be evident that the invention disclosed herebelow, for feeding the waste to the reactor, converting the waste in the reactor, removing and disposing of the residue, is based on the use of a unique catalyst in combination with a novel and unexpectedly efficient system of dealing with the numerous problems associated with feeding waste and catalyst to a molten lead bath in a sealed environment, including, for practical operation of the reactor, not submerging the waste in the molten lead. Further, not unexpectedly, the prior art processes and apparatus which rely solely on thermal pyrolysis of plastics and rubber in molten lead, are conspicuously devoid of data showing the effectiveness of the conversions obtained. As will be evident from the data presented below, the conversion of waste to reusable hydrocarbons by pyrolysis in molten lead alone, is only 53% (see Table 1) when the scrap is PE (polyethylene) and PP (polypropylene); and more than 90% when the catalyst used is bauxite/Al=97/3.

Recognizing the advantage of using an effective catalyst for the conversion of waste polyolefins, polystyrene and the like to hydrocarbons, U.S. Pat. No. 4,851,601 teaches using a fluid bed of zeolite particles, as does Chinese patent application WO95/06682. In each case, hydrocarbons having a wide range of boiling points are collected, but they rely on the efficient heat transfer provided by a fluid bed and the catalytic effect of a zeolite only, and the zeolite, by itself is evidently unaffected by the presence of chlorine in PVC.

SUMMARY OF THE INVENTION

The conversion of substantially halogen-free waste to desirable hydrocarbons is effected by providing an elongated generally rectangular vat or trough in which molten lead is held within a sealed, essentially oxygen-free housing, and the waste is contacted with a catalyst consisting of a combination of an aluminum oxide mineral powder <2 mm diameter, and essentially pure aluminum powder <0.1 mm diameter, while the waste is being heated with the melt. The catalytic action is evidently provided by the interaction of the pure aluminum and the aluminum oxide molecules. The aluminum mineral oxide powder is preferably calcined to avoid generating water from uncalcined oxide in the melt.

Waste, preferably compacted and fed unconfined to the inlet of the vat, floats on the melt and is mixed and tossed with a reciprocable steel grating while the waste is urged from one end of the vat to the other, being advanced longitudinally through the vat, without the waste being submerged in the melt. The steel grating moves from a position under the surface of the melt where it is heated, to a position above the melt where the grating transfers the heat to the waste. This feature, utilizing the much higher heat capacity of steel (nearly three times higher than that of lead) overcomes the problem of having molten lead solidify, essentially instantly, on the waste when it is submerged in the melt. Such solidification results because the rate of heat transfer from the melt to the waste is so high. Such waste, with lead solidified on it, must then be transported while being heated to liquefy the melt. Though submerging the waste in the melt will have the same thermal result, in a commercial reactor to which more than 1000 Kg/hr of waste is fed, it is difficult to move so much waste, with solidified lead on it, through the vat; and it is not practical to heat so much waste, with solidified lead on it, at a rate high enough to re-melt the lead on the waste and obtain an economical residence time.

The waste is intermittently advanced by using at least one, preferably plural, laterally spaced-apart rotatable drums, each provided with radially protruding blades which urge waste on the surface of the molten lead longitudinally along the length of the trough. Simultaneously, the waste is bathed with melt scooped up from near the surface of the bath. Because, as the waste is converted, the amount of floating waste is progressively reduced, the axis of rotation of each drum is lower than the preceding drum, that is, the axis of each successive drum is progressively vertically downwardly spaced-apart.

The use of the reciprocable mixing grating in cooperation with each drum, except the first near the inlet of the vat, urges waste upwards towards the drum and bathes floating waste with molten lead, thus providing the contact necessary to convert the waste while dealing with solidifying lead; simultaneously, "fingers" on the drum advance the waste through the vat. It is this unique mechanism for urging the floating waste through the molten bath without submerging the waste in the bath, in combination with the catalytic action of the catalyst used, and the essentially constant temperature of the molten lead held in a desired range of temperature, which accounts for the success of this waste-conversion process. High conversions to desirable hydrocarbons, and avoiding the formation of all but a relatively small amount of carbonaceous residue, is effected by choosing the appropriate temperature to match the waste being fed. Depending upon how clean the waste is, the residue will also contain stones, pieces of wire from scrap tires, pieces of stray metal, glass and other solids not decomposed at the temperature of the molten lead. The residue is continuously removed from the reactor with an endless chain conveyor.

Either crushed calcined bauxite alone, or aluminum powder alone, is insufficiently effective as a catalyst to convert waste, even when >90% (more than 90 percent) of the bauxite particles are <1 mm in diameter, and >90% of the aluminum powder particles are <0.1 mm (at least an order of magnitude smaller than bauxite). "Diameter" refers to the equivalent diameter of a particle. However, when a mixture consisting essentially of a major proportion by weight of the same bauxite is combined with a minor proportion of the same aluminum powder and contacted with both the heated waste and molten lead, the combination catalyst is typically more than 60% effective to convert the waste into reusable hydrocarbons. Unexpectedly, the substantially halogen-free, reactive atmosphere of hydrocarbons within the reactor, boosts the effectiveness of the aluminum powder rather than negating it.

Contact with molten lead, by waste and catalyst, both of which are much lighter than lead, is ensured by using a combination of successive drums with radially protruding mixing fingers which engage the waste in the floating layer as it is moved upwards by a grating. The grating is part of a U-shaped saddle forming a cooperating mixing and bathing assembly. The grating reciprocates at a slight angle, less than 30° to the vertical, heats the waste by contact with it, and bathes the floating waste with melt scooped from the surface of the bath. This combined action of heating and bathing the waste with melt and also urging it longitudinally along the length of the bath, allows conversion of the waste with a residence time in the molten bath of less than 1 hour, preferably less than 30 min.

Though lead melts at 327.5° C. (621.5° F.), optimum effectiveness of the catalyst is achieved at a temperature in the narrow range from about 450° C.-550° C. (842° F.-1022° F.); conversions to reusable hydrocarbons drops off at temperatures below 450° C., but above 400° C., and above 550° C. but below 600° C. where conversion to $C_5^+$ hydrocarbons decreases, and to $C_4$ and lower hydrocarbons increases above 20%, and normally negligible oxidation to CO and $CO_2$ increases.

A process for pyrocatalytic conversion of organic waste comprises, feeding waste into a reaction zone of a pyrocatalytic reactor, the waste being essentially free of a halogenated synthetic resinous material; mixing the waste with a minor proportion by weight of a catalyst in a bath of molten lead held at a temperature in the range from 400° C. to 600° C. in an elongated vat; recovering hydrocarbons generated in the reactor; and, removing carbonaceous residue. Thus, though the waste is unconfined, except by the surface of the melt, the waste is thermally and catalytically converted with at least 50% effectiveness into reusable hydrocarbon vapors which are condensed.

The catalyst consists essentially of a major proportion by weight of bauxite powder, preferably calcined, in combination with a minor proportion of the aluminum powder having a minimum nominal aluminum content of at least 95%, preferably at least 98%, and a Fe content of less than 0.5% and Si less than 0.2%. The amount of the catalyst required is preferably no more than 20% by weight of the waste charged, preferably less than 10%, most preferably less than 5%.

The system for converting the waste comprises an elongated vat which is confined in an essentially oxygen-free environment of the reactor; the vat has a feed-inlet or "charging" end and a "residue-discharging" or "discharging" end; the length of the vat is sufficient to afford a residence time for the waste of no more than one hour, and the depth of molten lead in the vat is at least 10 cm. The waste on the molten lead is urged along the vat's longitudinal axis and bathed, substantially simultaneously, with melt. The contact of waste with melt is effected by a reciprocable grating moving into and out of the melt. Preferably, the reactor is fed with a feeding mechanism which compacts waste into a feed tube at the inlet of the reactor, forming an air-tight seal; and carbonaceous residue is discharged by being compacted against an inclined plane and an adjustable continuous chain conveyor into a residue-disposing assembly.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
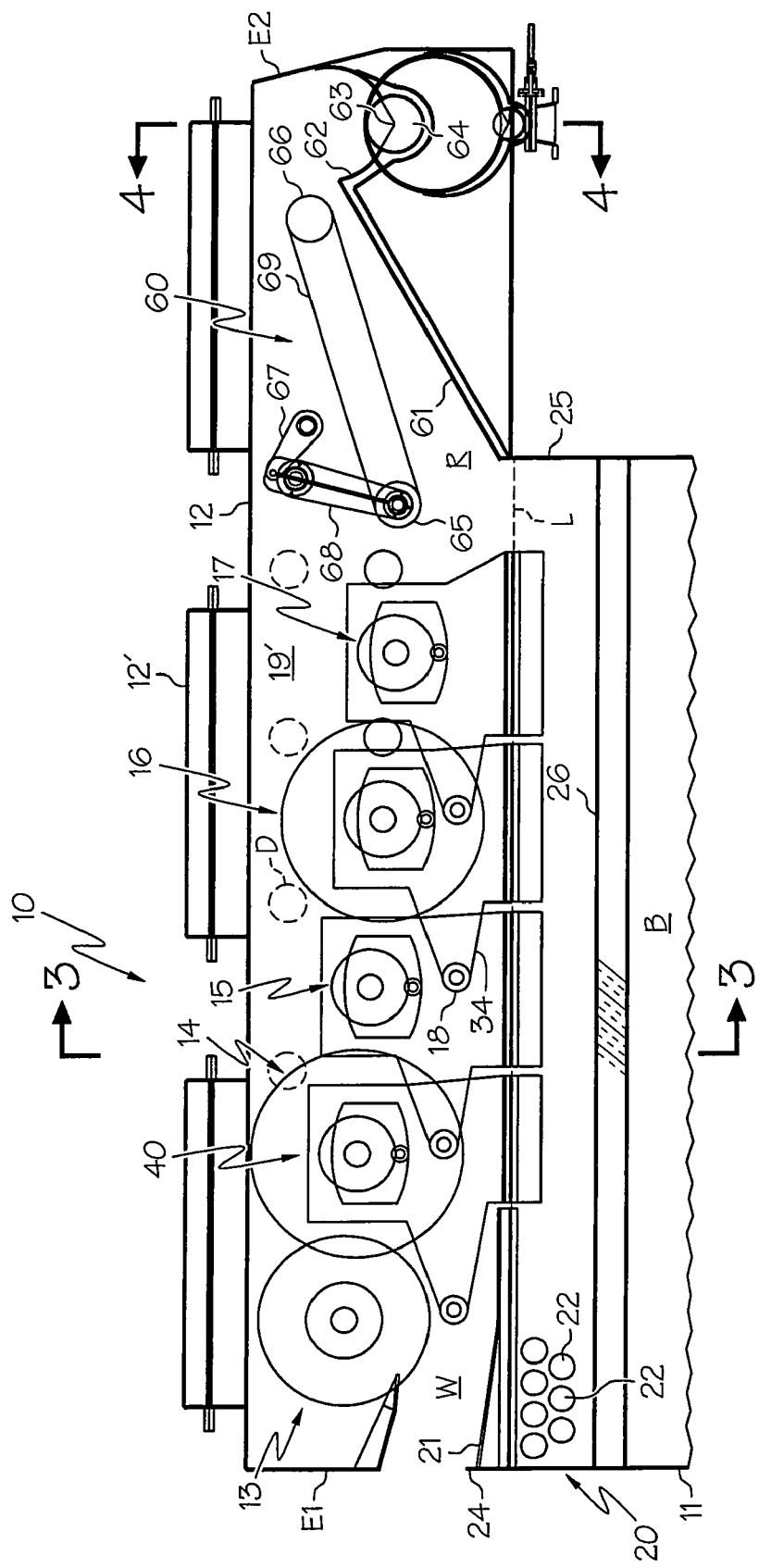
FIG. 1 is an overall side elevational view schematically illustrating the main components of the system.

The key feature of the process is contacting the waste with a combination catalyst selected from the group consisting of a particulate calcined hydrated aluminum oxide and a zeolite, mixed with aluminum powder in a molten lead bath. The waste is typically selected from the group consisting of a polyolefin, e.g. PE and PP; a poly(vinyl aromatic), e.g polystyrene; a polyamide, e.g. nylon; a rubber derived from a conjugated diene, the diene having from 4 to 5 carbon atoms, e.g. polybutadiene and polyisoprene, whether natural or synthetic; and, a rubber defined as a polyblock copolymer of a vinylaromatic compound and a conjugated diene, optionally hydrogenated to include a block of a monoolefin, the olefin having from 2 to 4 carbon atoms, e.g. Kraton® styrene-butadiene-styrene or "SBS" rubber. The term "aluminum oxide mineral" refers to minerals which contain a high amount of alumina, for example the hydrated aluminas and the zeolites which are alumino-silicates. This combination catalyst, in which the preferred aluminum oxide mineral is a calcined hydrated alumina, results in a practical residence time of less than 1 hour results from mixing the waste and forcefully urging it from the feed-charging or inlet end of the vat to the residue-discharging end of the vat.

Aluminum powder consists essentially of microgranules most of which have an equivalent diameter of less than 44 μm, each being essentially pure aluminum (>99.5% Al) coated with a thin skin less than 0.1 μm thick (referred to as a "nanothick skin"). Such powder is preferably made by atomization of molten aluminum through small orifices in an atomizing head immersed in molten aluminum. As molten aluminum flows through the orifices it strikes a stream of compressed air. This forms a spray of aluminum melt which is quenched at rates on the order of $10^2$ to $10^{8}$° K./sec to form substantially spherical microgranules of pure Al coated with an aluminum oxide skin from 3 to 20 nm thick.

The most preferred finely divided aluminum oxide mineral is calcined bauxite (and commercially available), though less readily available particulate gibbsite (a trihydrate), boehmite and diaspore (monohydrates), may also be used. When initially starting up the system, to facilitate catalytic conversion of the waste, catalyst is dropped onto freshly molten lead in the vat, from hatches (openings) in the roof of the reactor. Before feeding waste to the reactor it is mixed with a small amount of additional catalyst so that the amount of catalyst in the waste while it is in the reactor is in the range from about 0.5% to 20%.

The preferred bauxite employed by the process is particulate bauxite, available in Poland as "Boksyt kalcynowany", in a size range <1 mm having the following analysis: $Al_2O_3$— min 86% (typically 87.2%); $Fe_2O_3$—max 2% (typically max 1.6%); $K_2O+Na_2O$—max 0.25% (typically 0.18%) and $SiO_2$— max 6% (typically 5.2%); the sp. gr. is in the range from 2.5-3.2, the bulk density is about 3.1 g/cc the apparent porosity is <10. More than 50% of all particles are in the size range from about 50 µm to 250 µm, less than 10% being smaller than 50 µm, and the remaining being in the range from 250 µm to 0.1 mm.

Aluminum powder is preferably metallurgical grade available from Benda-Lutz Skawina having the following typical analysis: 99.7% Al; 0.28% Fe; and 0.07 Si. A typical particle size distribution is as follows: 77.6%>0.032 mm; 36.1%>0.063 mm; and 4.0%>0.09 mm. The average particle diameter of the Al powder is in the range from about 25-50 µm. Comparable aluminum powder is available from Alcoa in the Grade 100 and Grade 1200 series, among others.

A preferred ratio of the aluminum powder to bauxite powder is in the range from about 0.5-20% aluminum powder, preferably in the range from about 1-10% aluminum powder, most preferably less than 5%, there being very little economic improvement in conversion when the amount of aluminum powder exceeds 10%.

Instead of mixing calcined aluminum oxide mineral, e.g. bauxite with aluminum powder, an alternative method for preparing the catalyst is by spraying a molten stream of aluminum at a temperature above 1200° C. onto a falling stream of bauxite particles in the size range given above. This results in the aluminum powder being adhered to and supported on the particles of bauxite. In one embodiment, this may be achieved by mixing solid particles of aluminum metal into the flame of an oxy-acetylene torch at a temperature in the range from about 2000° C. to 3000° C. and directing the flame at a falling stream of particles of bauxite. The same may be done with any other aluminum oxide mineral, whether zeolite, gibbsite, etc.

The pyrocatalytic conversion of waste is most effective when the system is fed with waste which is not "mixed" waste, but a particular class of waste, e.g. polyolefins; or polystyrene; or scrap rubber from vulcanized polybutadiene, polyisoprene and natural rubber in automobile, truck and aircraft tires. To a lesser extent, the catalyst is also effective with other poly(vinyl aromatic) resins, nitrile rubber, styrene-conjugated diene-styrene rubber, acrylate rubber and other predominantly hydrocarbon plastics. It is therefore desirable to sort the waste to provide a particular material to be converted under temperature conditions and a ratio of catalyst components specifically chosen for that material.

Irrespective of the particular waste chosen, its specific gravity is typically about 1 or less, and, when fed into the molten lead, the waste will be forcefully thrust to the surface, forming a waste layer which functions as insulation, minimizing contact of all but the bottom of the layer with the molten lead and catalyst.

Though any bath containing a predominant amount of lead may be used, a lead bath containing less than 10% by weight of another metal is preferred. Such a bath provides a high heat transfer coefficient, the heat content of the bath is rapidly exhausted as waste is converted, and the heat must be just as rapidly replenished. The limitations this places on the system are magnified by (i) heat conduction occurring primarily in the vertical direction as the source of heat is from below the melt, and (ii) the layer of floating waste effectively insulating the upper portion of the layer from the heat in the melt. Therefore it is critical that, to meet an economic residence time of less than an hour, the floating waste be actively bathed with melt as the waste is urged along longitudinally along the surface of the melt.

It is not necessary, if the waste is polyolefin film, or small containers thereof, to comminute the waste, but it is desirable to cut up tires into pieces having an average weight in the range from about 50 g-1 Kg, thus avoiding the cost of comminuting the tires into pieces weighing less. Means for cutting up tires are well known and any of these means may be employed with varying degrees of effectiveness, those providing relatively smaller similarly sized pieces being easily fed into and submerged in the molten lead.

Figures 2, 2A:
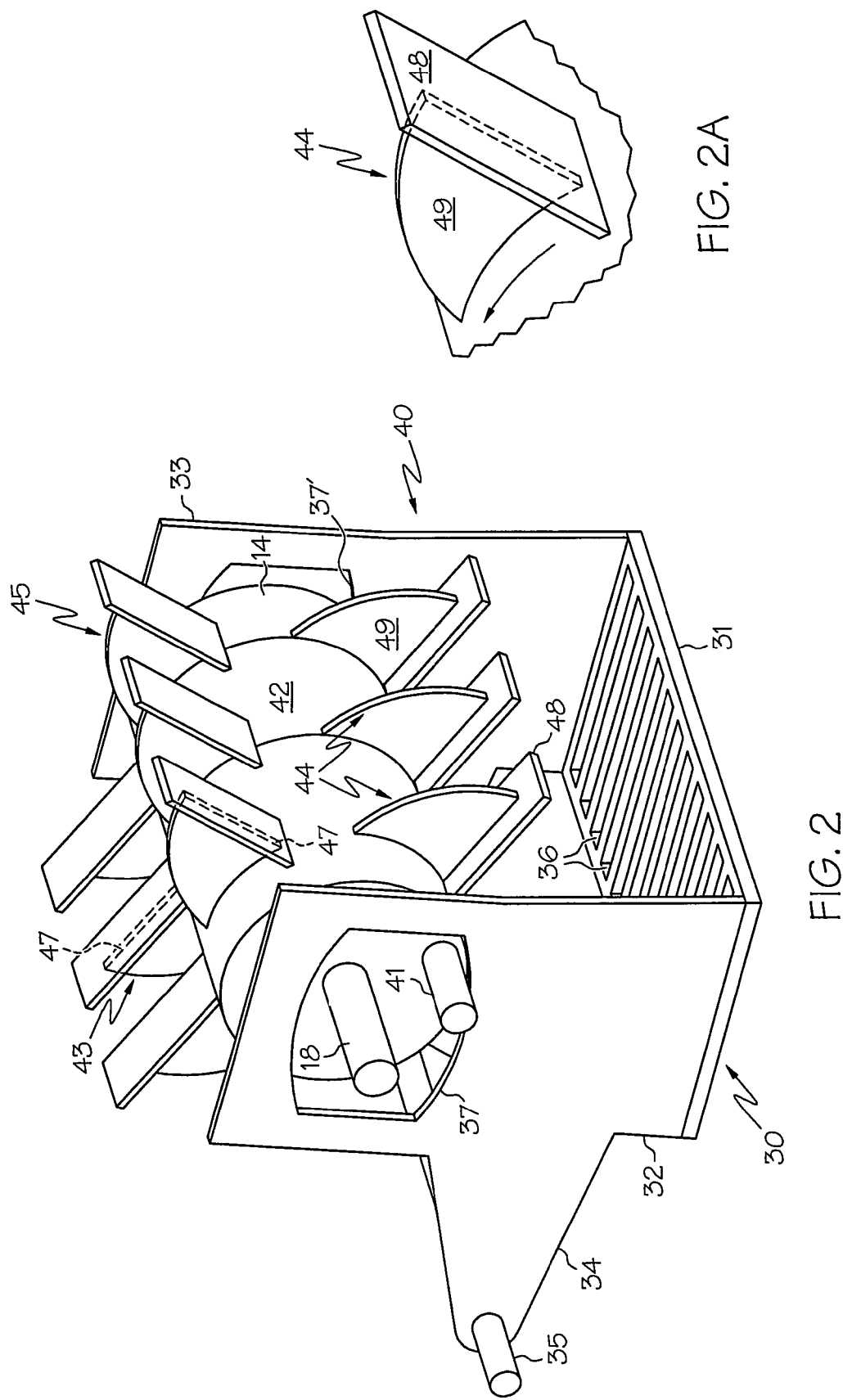
FIG. 2 is a perspective view illustrating a mixing and bathing assembly used to provide the necessary contact of waste and melt.
FIG. 2A is a detail of one effective embodiment of a mixing and urging finger welded to the surface of each mixing drum.
Figure 3:
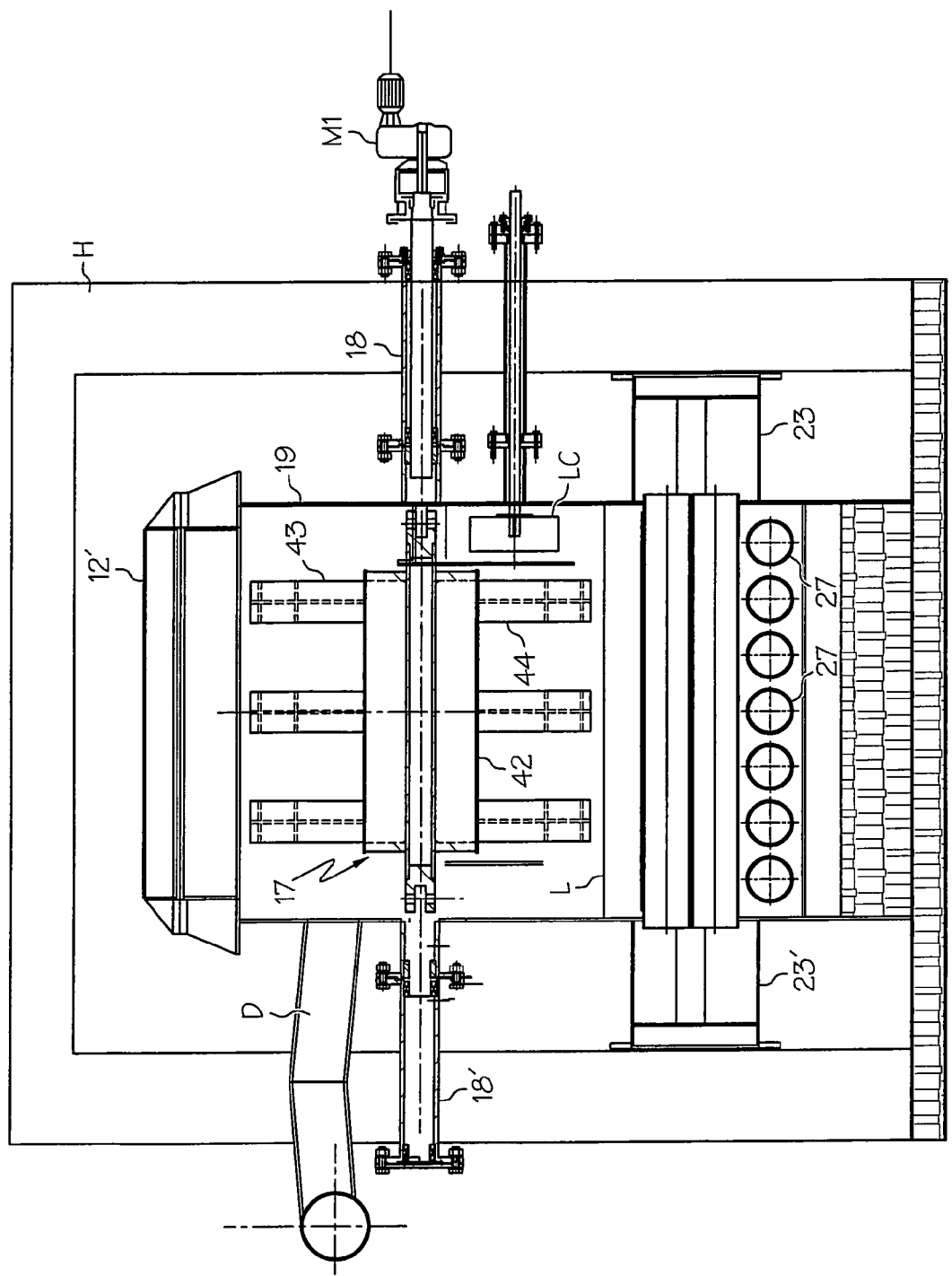
FIG. 3 is a cross-sectional view in the vertical plane 3-3 in FIG. 1, looking in the direction of the arrows, without showing the U-shaped saddle under the drum.
Figure 4:
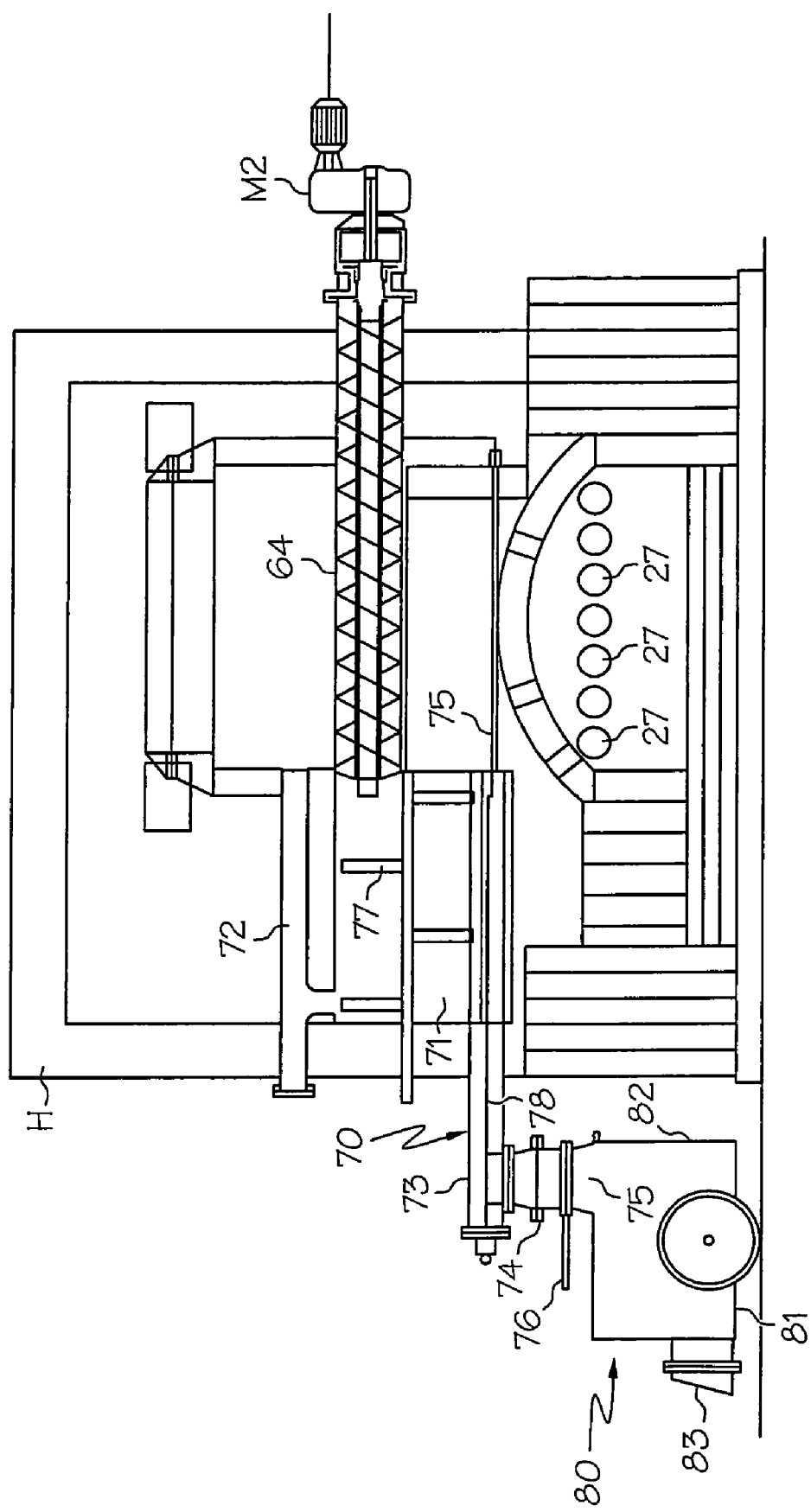
FIG. 4 is a cross-sectional view of the reactor taken along the vertical plane 4-4 in FIG. 1 looking in the direction of the arrows.

Referring now to FIGS. 1-5, the system includes a feeding mechanism, referred to generally by reference numeral 90 (see FIG. 5), through which waste W is fed to a reactor 10 housed in an insulated housing H (not shown in FIG. 1, see FIG. 4). Waste W is converted to hydrocarbons in an elongated, heated vat 20 in the reactor, leaving a residue R which is discharged first through a residue-discharging mechanism 60, and thereafter, to a residue-disposing mechanism 80. The waste W is compacted and fed to the reactor 10 as a dense, tightly-packed mass of W which functions as an effective air-tight seal to prevent entry of air into the inlet end of the reactor. The waste W enters the vat on an inlet-incline 21 functioning as a feed-guide for waste and guiding it to flow beneath a first of at least two, and preferably five urging drums 13, 14, 15, 16 and 17, each rotatably mounted on axially aligned supporting shafts 18 and 18' (see FIGS. 2 and 3), one of which (18') is a passive shaft, the other 18 driven by drive means such as an electric motor M1 (FIG. 3).

The reactor 10 preferably comprises a box-shaped reinforced steel casing 11 having a roof 12, front and rear sidewalls 19 and 19' (only rear sidewall 19' is shown) and end walls E1, E2 all of which are insulated to conserve heat within the reactor, and further protected by an outer insulated structure (not shown in FIG. 1). The roof 12 is provided with removably sealable covered hatches 12' to allow catalyst to be charged to the vat initially (before commencing operation of the reactor), and to permit servicing the reactor. In the vault above the vat 20, near the top of rear sidewall 19' are provided several laterally spaced-apart effluent ducts "D" through which hydrocarbon vapors are ducted to a vapor recovery system (not shown).

Heat to the lead in the vat 20, resting on an insulated base B, is supplied by a heating system including at least one array of plural, parallel, heating tubes 22 spaced-apart along the x-axis, and preferably multiple parallel arrays, one disposed above the other, the heating tubes of the one array being staggered relative to the other. The tubes 22 are in open communication with side hot-air manifolds 23, 23' (FIG. 3) on either side of the vat, through which manifolds and tubes a heating medium is ducted, back-and-forth, until the heating medium leaves the heating system. Preferably the heating medium is provided by hot gases generated by burners fueled by oil or natural gas. The details of the means for heating the lead in the vat are not narrowly critical as long as the heating medium is supplied at a temperature above about 600° C. or 650° C., preferably above 900° C. such temperature being provided by the hot gases. Sufficient lead is loaded into the vat so that when the lead is molten, its level "L" is preferably at least 10 cm above the upper surface of the uppermost array of heating tubes in the bath. The molten lead presents a planar surface extending from the vat's inlet end 24 to its discharge end 25.

A convenient size for the internal dimensions of a reactor is about 7.5 m long×1.2 m wide and 2.1 m high, the length of the bottom 26 of the vat corresponding to that of the bottom of the reactor.

Referring to FIG. 2, there is shown a hollow, acid-resistant steel drum 14 with its axis of rotation along the x-axis in a mixing and bathing assembly 40. Drums 15, 16, 17 and 18 are similar to drum 14 and are about equidistantly longitudinally spaced-apart from one and another (along the y-axis) inside the reactor. Because the amount of waste under each successive drum 14-18 progressively diminishes as W is converted, the height at which each drum 15-18 is mounted within the reactor, decreases progressively. Thus, the axis of rotation of drum 14 is lower than that of drum 13; the axis of rotation of drum 15 is lower than that of drum 14; the axis of rotation of drum 16 is lower than that of drum 15; and so forth, drum 17 being mounted for rotation closest to the level L because substantially all the waste has been converted at that point.

Each drum is independently rotatable and provided with its own mixing and bathing assembly 40. Drum 13 being positioned near the inlet of the reactor does not have a mixing and bathing assembly as its sole function is to urge the waste under the drum 14. The height at which drum 13 is mounted depends upon the particular feed, being higher for polyolefin sheet and lower for scrap rubber. In general, the spacing of the lower surface of the drum 13 from the surface of the melt L, is in the range from 25-35 cm, and the spacing of the other drums, successively lower, the spacing of the lower surface of the last drum 17 being in the range from about 10-15 cm above L.

The length of each drum (along the x-axis) is approximately the same as the width of the vat 20 (along the x-axis), and each end of each drum 14-17 has a cam-follower rod 41, 41' (not shown) secured near the circumference of each drum's end, the rods 41, 41' projecting parallel to shafts 18, 18', in the x-axis direction. The circumferential surface 42 of the drum is provided with plural, generally laminar radial projections 43, 44, 45, 46 (not visible) spaced-apart axially, in rows along the surface and staggered in spaced-apart relationship around the circumference. As shown, four rows of projections are staggered at right angles to each other, each pair of rows being positioned at diametrically opposite ends. These projections are referred to as "mixing and urging blades", more conveniently as "fingers", because their function is to mix the waste under the drum and urge the waste away from the drum, along the y-axis. Though the shape of each of the fingers is not narrowly critical, it is preferred they be relatively broad at their straight edges 47, projecting radially, for maximum thrust efficiency. As shown in the schematic detail of a finger in FIG. 2A, a strip 48 is welded at right angles to an arcuate piece 49 which reinforces strip 48, and both are welded to the surface 42 of the drum. The arrow shows the direction of rotation of the drum. As the drum rotates, the leading edge of the arcuate reinforcing 49 moves through the waste and directs it against the strip 48.

A U-shaped saddle 30 having a grating 31 and sides 32, 33, is pivotably mounted with generally triangular flanges 34, 34' (not shown) for oscillation about a pivot rod 35. The grating 31 is provided with plural parallel, spaced-apart slits 36. Each side 32 and 33 has a cam-opening 37, 37' of identical outline cut into each side, so as to allow the respective cam-follower rods 41, 41' to ride the inside edges of each cam-opening as the drum rotates. The rotation of the drum thus raises and lowers the grating in a slightly angulated, generally vertical direction, between an "up" position above the melt and a "down position under the surface of the melt. This motion simultaneously raises the floating waste while heating it, and scoops up melt coming through the slits 36 so as to bathe the waste with melt. Preferably, the "up" position is about 5 cm above the melt's surface and the "down" position is about 5 cm below the melt's surface.

To ensure that the waste is efficiently transferred from under one drum to the next, the radial length of the fingers is such that the tips of the fingers in each row sweep past close to the surface of the grating 31. This action requires that the longest fingers 44 sweep the grating when it is at its nadir (lowest point) in the melt, and that the fingers 46 be shortest when the grating is at its apogee (highest point) above the melt. This is achieved by aligning the cam-follower rods 41, 41' with the longest fingers when the rods 41, 41' are welded to the drum.

As waste W is mixed, bathed with melt and transported through the reactor, the waste is converted into $C_1$-$C_{24}^+$ hydrocarbons, CO and $CO_2$ which are removed from the reactor through effluent ducts D, leaving a residue R. The R-discharging mechanism 60 and the R-disposing mechanism 80 cooperate to provide an effective air-tight seal at the outlet end of the reactor.

It is seen that the R-discharging mechanism 60 comprises a discharge-incline 61 the lower edge of which commences at the upper edge of the vat 20 at its outlet end 25. The upper edge of the incline 61 terminates in a U-shaped saddle 62 in which the inverted apex 63 is V-shaped so as to accommodate the upper portion of a discharge screw of screw conveyor 64. Above the discharge-incline 61 is proximally mounted an endless chain conveyor 69, having a drive cylinder 65 on which the chain is drivingly trained, and which chain goes around stationary passive cylinder 66, the drive cylinder being at the lower end of the conveyor. The vertical position of the drive cylinder 65 is adjustable by movement of a pivot arm 67 that is connected to the drive cylinder with a link 68 so that the angle at which the chain conveyor operates is in the range from 1° to about 20° to the horizontal. In operation, the lower portion of the chain around the passive cylinder 66 is about 5 cm above the upper edge of the discharge incline 61, and the lower portion of the chain around the drive cylinder is about 15 cm above the lower edge of the discharge incline so that the chain is able to urge residue R up the discharge incline and over its upper edge into the V-shaped saddle 62. The angle at which the chain conveyor is operated is chosen as a function of the particular type and amount of residue R generated.

When residue R is dropped into the saddle 62, the screw conveyor 64 pushes the residue R out of the saddle into the R-disposing mechanism 70 (see FIG. 4).

Referring to FIG. 4 there is schematically illustrated the screw conveyor 64 driven by a motor M1 which drives the screw until it drops residue R into a vented residue collection chamber 71 provided with an overhead recycle duct 72 to recycle gases from the chamber 71 to the environment in the reactor, above the vat 20. The chamber 71 has mounted therewithin a manually operable ("hand-cranked") paddle agitator 77 which may be intermittently rotated to mix the residue and prevent it clumping up. The floor of the chamber 71 is provided with a central semi-cylindrical trough extending beyond the chamber as pipe 73 having a discharge outlet 74. A manually operated screw conveyor 78 is rotatably disposed in the trough and extends into the pipe 73 so that when shaft 75 of the screw conveyor 78 is rotated, residue is conveyed to the discharge outlet 74 which is normally sealed against entry of air with a gasketed sealing plate 75 and cooperating quick-opening and quick-closing clamp 76.

Intermittently, a residue-disposing means 80 is locked to the discharge outlet 74 to receive the residue. Preferably a sealable, wheeled cart 81 is used, the cart having an opening 82 in the ceiling of the cart, and another opening 83 in an endwall near the floor of the cart. Each opening is provided with plates and quick-opening and quick-closing clamps which seal the interior of the cart against leakage of gas. Opening 82 is opened and locked to the discharge outlet 74 when the cart is to be loaded with residue R discharged from the collection chamber 71. When the cart is locked in this position, the screw conveyor 78 is rotated, and residue R is discharged into the opening 82 of the cart.

Reverting to FIG. 3, it is seen that drum-supporting shafts 18 and 18' are supported in the sidewalls of structural insulated housing H (see FIG. 4) that protects and insulates the reactor 10. The drum 17 is show with only three fingers in each row, and the U-shaped saddle 30 is not shown so as to minimize confusion. Waste W is forced under the plural drums above the surface of the melt to which heat is supplied, first through longitudinal heating tubes 27 under the melt, and then by plural banks of transversely disposed heating tubes 22 (see FIG. 1), the hot gases traveling from one bank to the next through the side manifolds, until ducted away from the reactor. Hydrocarbons are led from ducts D to a condenser where they are condensed to recover mainly some $C_4$ and essentially all the other components heavier than $C_4$. The level of the surface of the melt is monitored by level control LC in one side 19 of the reactor.

Figure 5:
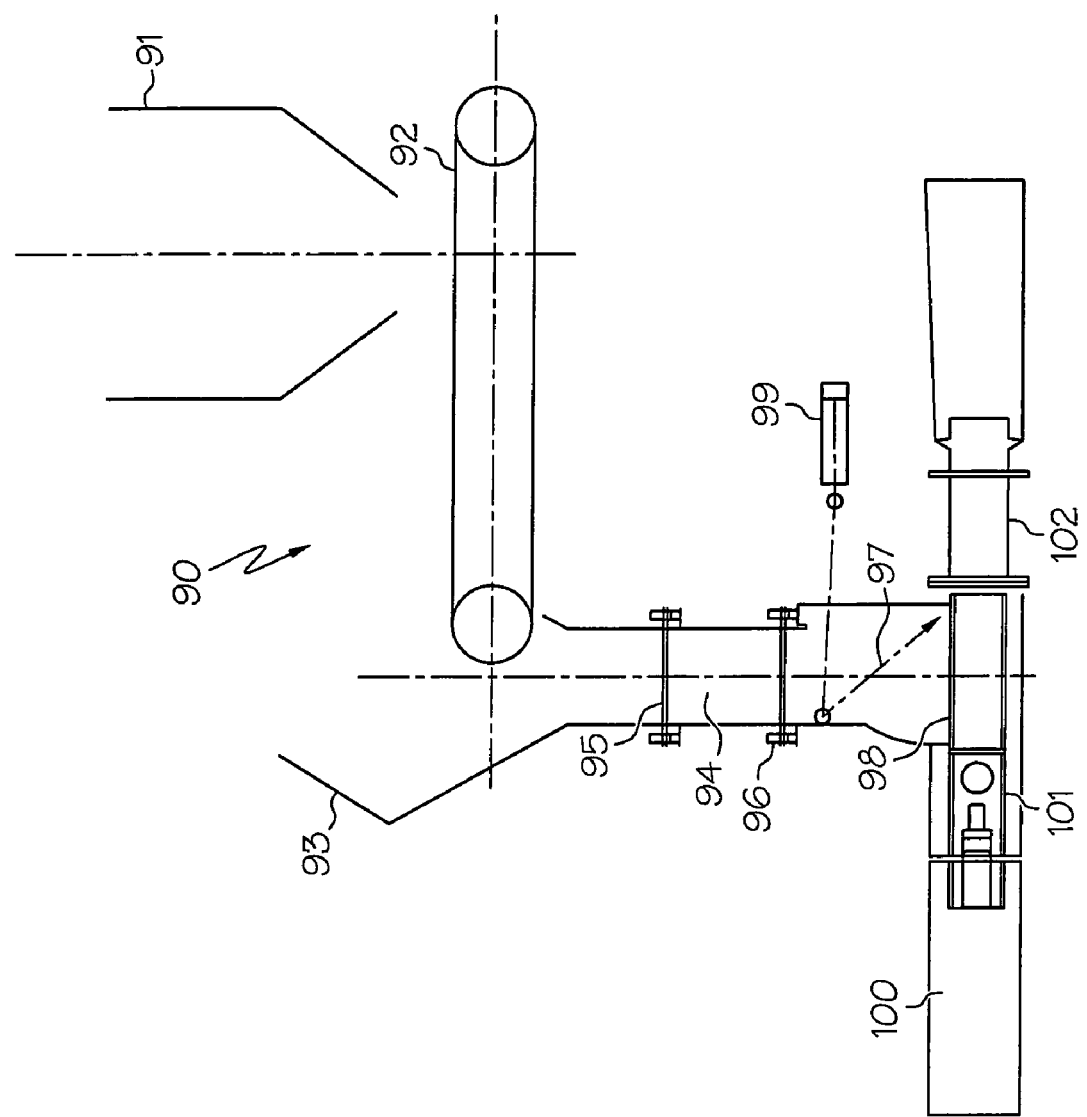
FIG. 5 illustrates an embodiment of a feeding mechanism.

Waste W may be charged to the reactor R with any conventional feeding mechanism 90 such as is illustrated in FIG. 5, provided the inlet to the reactor is sealed against entry of air. In the mechanism illustrated, waste W is dumped into a feed bin 91 from which it is discharged onto a endless conveyor 92 and into a waste-charging hopper 93 in open communication with a charging lock 94 defined by spaced-apart quick-opening and closing valves 95, 96. Valve 96 is positioned above an initial waste-compressing feeder 97 adapted to feed the waste W to a single-stage fluid-actuated press 100. A plate 98 is pivotably mounted between the feeder 97 and the press 100 for movement from a vertical position (which allows waste to flow past the plate), to a horizontal position, closing the lower opening of the feeder 97. A fluid-actuated cylinder 99 opens and closes the plate 98.

After the waste W is initially compressed in the press 100, a ram 101 compresses the waste horizontally and forces the W into and through a flanged connector tube 102 which connects the inlet of the reactor in open communication with the press 100. With this arrangement it is seen that the volume between the connector tube 102 and the inlet to the reactor is so densely packed with waste W that the waste forms an air-tight seal preventing entry of air into the reactor, and exit of gases out of the reactor.

The invention described herein is further described by the following specific examples that are given by way of illustration and not as a limitation on the scope of the invention.

The following runs were made with (1) scrap polyolefin waste, mainly PE and PP; (2) scrap rubber obtained by cutting up worn automobile tires; (3) polystyrene; and (4) scrap Kraton® styrene-butadiene-styrene block copolymer, referred to as "SBS". All runs use a mixture of the calcined bauxite and aluminum powder in various proportions as catalyst. The mixture of waste and catalyst is fed in less than one minute, to a pilot plant scale reactor containing a molten lead bath maintained at about 500° C. In each run, 1 Kg of the waste is mixed with 200 g of catalyst, to ensure maximum conversion. In the following Table 1, "% conversion" refers to the ratio of reusable hydrocarbons to waste fed, and the amounts of bauxite and Al powder are stated in grams. Most of these hydrocarbons, which are recovered in a water-cooled heat exchanger, boil in the range from 40° C.-400° C.; the remaining hydrocarbons, in the range from $C_1$-$C_4$, are present in an amount less than 20% of the condensed hydrocarbons. The cooling water used in the examples is recycled after being air-cooled, for example in heat exchangers to heat offices in the vicinity of the reactor, and enters the condenser at 30° C. Colder water will result in more $C_5^+$ components being condensed, it being understood that conditions of pressure and temperature in the condenser are such that predominantly $C_5^+$ components condense in the liquid phase which is in equilibrium with vapors saturated with the components. All runs are completed in less than 30 min, after which the reactor is allowed to cool and the residue recovered.

TABLE 1

| Ex. No. | Waste | Bauxite | Al powder | % Conv. |
|---|---|---|---|---|
| 1 | PE/PP | none | none | 53 |
| 2 | PE/PP | 200 | none (100% bauxite) | 70 |
| 3 | PE/PP | none | 200 (100% Al) | 94 |
| 4 | PE/PP | 194 | 6 (3% Al) | 97 |
| 5 | rubber | 200 | none (100% bauxite) | 40 |
| 6 | rubber | none | 200 (100% Al) | 55 |
| 7 | rubber | 194 | 6 (3% Al) | 53 |
| 8 | polystyrene | 194 | 6 (3% Al) | 80 |
| 9 | SBS | 194 | 6 (3% Al) | 40 |

It is evident from the foregoing data for conversions of bauxite and Al powder, individually, that 97% bauxite and 3% by weight of pure Al powder is more effective than pure Al powder by itself. One would expect (by ratioing yields of PE/PP obtained with bauxite and Al powder, individually) that 3/97 of Al/bauxite would yield 70.81% conversion.

Ratioing yields of scrap rubber obtained with bauxite and Al powder, individually, it is evident that 3/97 of Al/bauxite would yield 40.45% conversion, not 53%.

It is evident, that quite unexpectedly for each waste, the combination of Al/bauxite produces a much higher conversion than calculated.

It is also evident that the same combination produces lower conversions of scrap rubber, polystyrene and SBS rubber, than of PE/PP, but it is economical to process most such waste in the reactor because it yields at least 40% by weight conversion (of the waste fed) to $C_5^+$ hydrocarbons.

Example 10

Molten Lead Bath Temperature: 465° C.-495° C.

1 Kg of PE/PP is mixed with 200 g of catalyst containing 97% calcined bauxite and 3% Al powder, and fed to the bath in less than 1 min. The effluent vapors from the reactor were condensed in a water condenser (water temperature about 30° C.). Boiling points of the condensed hydrocarbons range from 210° C.-400° C. The weight of the condensate is 930 g, indicating 93% conversion of PE/PP.

In an analogous manner, polyester from discarded beverage bottles and polyamide, i.e. nylon scrap is also converted, though with lower conversions.

Examples 11-13

Effect of Concentration of Al Powder on Conversion of scrap Rubber from Vehicle Tires in Various Temperature Ranges:

1 Kg of the scrap rubber in pieces each weighing less than 50 g, and with strands of wire still in the rubber, is mixed with 200 g of catalyst containing the stated amounts (in grams) of calcined bauxite and Al powder, and fed to the bath in less than 1 min. The effluent vapors from the reactor were condensed in a water condenser (inlet water temperature about 30° C.). Boiling points of the condensed hydrocarbons range from 235° C.-400° C. In the following Table 2, the weights of bauxite, Al powder and the condensate collected, is given in grams, and also as "% conversion" (% of rubber fed).

TABLE 2

| Ex. No. | Bauxite | Al powder | % Al | Temp. ° C. | Condensate | % Conv. |
|---|---|---|---|---|---|---|
| 5 | 200 | none | 0.0 | 490-520 | 400 | 40 |
| 11 | 197 | 3 | 1.5 | 500-520 | 400 | 40 |
| 7 | 194 | 6 | 3.0 | 490-520 | 530 | 53 |
| 12 | 190 | 10 | 5.0 | 490-520 | 520 | 52 |
| 13 | 185 | 15 | 7.5 | 485-520 | 550 | 55 |
| 6 | none | 200 | 100 | 490-520 | 550 | 55 |

It is evident from the foregoing data that maximum conversion of rubber at the stated temperature is obtained with from about 3-10% by weight of Al powder.

Having thus provided a general discussion, described the overall process and apparatus in detail and illustrated the invention with specific examples of the best mode of carrying out the process, it will be evident that the invention has provided an effective solution to an old and difficult problem. It is therefore to be understood that no undue restrictions are to be imposed by reason of the specific embodiments illustrated and discussed, and particularly that the invention is not restricted to a slavish adherence to the details set forth herein.

I claim:

1. A process for the pyrocatalytic conversion of a predominantly hydrocarbon waste comprises, feeding the waste, substantially free of a halogen-containing synthetic resinous material, into a bath of molten lead held at a temperature in the range from about 400° to 600° C. in a vat confined in a reaction zone having an essentially oxygen-free atmosphere; mixing the waste with a catalyst in an amount no more than 20% by weight of the waste fed, the catalyst comprising a physical mixture of a major proportion by weight of particulate aluminum oxide mineral having particles less than 2 mm in equivalent diameter, in combination with a minor proportion of essentially pure aluminum powder wherein substantially all particles have an equivalent diameter less than 0.1 mm; urging the waste along the vat's longitudinal axis while contacting the waste with the molten lead; thermally and catalytically converting the waste with at least 50% effectiveness into reusable hydrocarbon vapors and carbonaceous residue; removing the reusable hydrocarbon vapors from the reaction zone; and, removing the carbonaceous residue from a residue-discharging zone.

2. The process of claim 1, wherein the waste is a polyolefin; polyvinyl aromatic); polyamide; rubber derived from a conjugated diene, the diene having from 4 to 5 carbon atoms; or rubber defined as a polyblock copolymer of a vinylaromatic compound and a conjugated diene, optionally hydrogenated to include a block of a monoolefin, the olefin having from 2 to 4 carbon atoms; or combinations thereof; and, recovering the reusable hydrocarbons containing a major proportion by weight of $C_5$ plus hydrocarbons and a minor proportion of $C_1$-$C_4$ hydrocarbons.

3. The process of claim 2, wherein residence time for the waste in the vat between its waste-charging end and its residue-discharging end, is no more than one hour, and including, recovering a condensate consisting essentially of $C_5$ plus hydrocarbons.

4. The process of claim 2, including floating a layer of the waste on the molten lead near the waste-charging end of the vat; and, wherein the aluminum mineral oxide is comprises a calcined hydrated aluminum oxide, and the condensate of $C_5$ plus hydrocarbons is at least 40% by weight of the waste fed.

5. The process of claim 4, wherein the temperature of molten lead is in the range from about 450° to 550° C., and is maintained by passing a fluid heating medium through plural ducts transversely disposed relative to the longitudinal axis of the vat, and the temperature of the heating medium under the molten lead's surface near the waste-charging end of the vat is above 600° C.

6. The process of claim 5, wherein the heating medium is hot gas, and the waste in the vat is unconfined except by the surface of the molten lead.

7. The process of claim 6, wherein mixing and transport of the waste in the molten lead is effected by plural spaced apart, rotatable, first, intermediate and last mixing drums successively arrayed in generally parallel relationship, each also vertically spaced-apart from a preceding drum at a lower axial position than the preceding drum so as to effect transfer of the waste from point of entry into the reactor until the waste is moved as residue to a location under the last drum.

8. The process of claim 6, comprising removing the residue in the residue-discharging zone with an endless conveyor urging the residue upwards along an incline to a residue-disposing means.

9. The process of claim 8, wherein the endless conveyor is adjustably operable to exert pressure on the residue, the conveyor being drivingly trained about a first drum having a vertically adjustable axis of rotation, adjustable over the residue-discharging end of the vat, and a second drum having a fixed axis of rotation, proximally disposed to the incline's upper surface.

10. The process of claim 2, wherein the amount of the catalyst mixture is less than 10% by weight of the waste, and wherein the amount of the aluminum oxide mineral is from about 80% to 99.5% by weight of the total weight of the aluminum oxide mineral and the aluminum powder.

11. The process of claim 10, wherein the bath comprises at least 90% lead by weight, wherein the aluminum oxide mineral comprises a calcined hydrated aluminum oxide and a zeolite.

12. The process of claim 11, wherein the amount of the aluminum oxide mineral is from about 90% to 99% by weight of the total weight of the aluminum oxide mineral and the aluminum powder.

13. The process of claim 10, wherein said aluminum oxide mineral has an equivalent diameter of less than 1,000 microns.

14. The process of claim 13, wherein at least 50% of the aluminum oxide particles have an equivalent diameter of from about 50 microns to 250 microns, and wherein said aluminum particles have an equivalent average diameter of from about 25 to 50 microns.

15. The process of claim 14, wherein the amount of said aluminum oxide mineral is about 90% to 95% by weight based upon the total weight of the aluminum oxide mineral and the aluminum powder.

16. The process of claim 15, wherein the amount of catalyst mixture is from about 0.5% to 5% by weight based upon the total amount of said the waste feed, and wherein the aluminum oxide mineral comprises a calcined hydrated aluminum oxide and a zeolite.

17. The process of claim 16, wherein the bath comprises at least 90% lead by weight.

18. A system for the conversion of organic waste, essentially free of halogenated synthetic resinous material, into reusable hydrocarbons, the system comprising:

a feeding mechanism to feed the organic waste into a catalytic reactor having a vat containing a bath having a majority by weight of molten lead therein at a temperature of 400° C. to 600° C., the catalytic reactor having a substantially oxygen-free environment;

a transporting mechanism to bathe and move the waste along the bath to a residue discharge end of the catalytic reactor;

the waste fed to the catalytic reactor containing a catalyst mixture therein comprising a majority by weight of aluminum oxide particles having an equivalent diameter of less than 2 mm and a minor amount by weight of essentially pure aluminum powder having a particle size of less than 0.1 mm, the amount of the catalyst being 20% or less by weight based upon the total waste feed weight; the catalyst capable of thermally converting at least 50% by weight of the waste feed into hydrocarbon vapors in the presence of said lead bath; and a vapor recovery system operatively connected to said catalytic reactor for recovering the hydrocarbon vapors.

19. The system of claim 18, wherein the amount of said aluminum oxide catalyst is from about 80% to 99.5% by weight and wherein the amount of said aluminum catalyst is from about 0.5% to 20% by weight.

20. The system of claim 19, wherein the amount of said catalysts in said waste is less than 10% by weight based upon the total waste feed weight.

21. The system of claim 20, wherein the amount of said lead in said bath is at least 90% by weight, and wherein the average equivalent diameter of said aluminum oxide catalyst is less than 1 millimeter.

22. The system of claim 21, wherein the temperature of said lead bath is from about 450° C. to about 550° C.

23. The system of claim 21, wherein said aluminum oxide catalyst comprises a calcined hydrated aluminum oxide and a zeolite, wherein the amount of said aluminum oxide catalyst is from about 90% to 99.5% by weight and wherein the amount of said aluminum catalyst is from about 0.5% to 10% by weight.

24. The system of claim 23, wherein at least 50% of the aluminum oxide particles have an equivalent diameter of about 50 to 250 mm, and wherein the average equivalent diameter of said aluminum powder is from about 25 to about 50 microns.

25. The system of claim 24, wherein the transporting mechanism is at least two rotating drums each having fingers thereon.

26. The system of claim 23, wherein said waste comprises a polyolefin; poly(vinyl aromatic); polyamide; rubber derived from a conjugated diene, the diene having from 4 to 5 carbon atoms; or rubber defined as a polyblock copolymer of a vinyl aromatic compound and a conjugated diene optionally hydrogenated to include a block of a monoolefin, the olefin having from 2 to 4 carbon atoms; or a combination thereof, and wherein the recovered hydrocarbon vapors comprise a major proportion by weight of $C_5$ plus hydrocarbons and a minor proportion of $C_1$-$C_4$ hydrocarbons.

27. The system of claim 18, wherein said waste comprises a polyolefin; poly(vinyl aromatic); polyamide; rubber derived from a conjugated diene the diene having from 4 to 5 carbon atoms; or rubber defined as a polyblock copolymer of a vinyl aromatic compound and a conjugated diene, optionally hydrogenated to include a block of a monoolefin, the olefin having from 2 to 4 carbon atoms; or a combination thereof.

* * * * *